(12) United States Patent
Irgang et al.

(10) Patent No.: US 10,896,632 B1
(45) Date of Patent: Jan. 19, 2021

(54) LAMP ASSEMBLY

(71) Applicant: Rebo Lighting & Electronics, LLC, Ann Arbor, MI (US)

(72) Inventors: Todd D. Irgang, Saline, MI (US); Orin C. Lenz, Canton, MI (US); Jon C. Beattie, Ann Arbor, MI (US)

(73) Assignee: REBO LIGHTING & ELECTRONICS, LLC, Ann Arbor, MI (US)

( * ) Notice: Subject to any disclaimer, the term of this patent is extended or adjusted under 35 U.S.C. 154(b) by 0 days.

(21) Appl. No.: 17/029,313

(22) Filed: Sep. 23, 2020

Related U.S. Application Data

(63) Continuation of application No. 16/778,056, filed on Jan. 31, 2020, now Pat. No. 10,818,205.

(60) Provisional application No. 62/801,944, filed on Feb. 6, 2019.

(51) Int. Cl.
| | |
|---|---|
| G09F 19/16 | (2006.01) |
| F21V 3/00 | (2015.01) |
| F21V 9/00 | (2018.01) |
| G09F 13/16 | (2006.01) |
| G09F 13/00 | (2006.01) |
| B60Q 1/30 | (2006.01) |
| B60Q 1/04 | (2006.01) |
| G09F 21/04 | (2006.01) |
| B60Q 1/26 | (2006.01) |
| F21S 43/31 | (2018.01) |
| F21W 105/00 | (2018.01) |
| F21S 41/32 | (2018.01) |

(52) U.S. Cl.
CPC ............... *G09F 19/16* (2013.01); *B60Q 1/04* (2013.01); *B60Q 1/2607* (2013.01); *B60Q 1/30* (2013.01); *F21V 3/00* (2013.01); *F21V 9/00* (2013.01); *G09F 13/005* (2013.01); *G09F 13/16* (2013.01); *G09F 21/04* (2013.01); *F21S 41/32* (2018.01); *F21S 43/31* (2018.01); *F21W 2105/00* (2018.01)

(58) Field of Classification Search
CPC ... B60Q 1/26; B60Q 1/22; B60Q 1/04; B60Q 1/02; G09F 19/16; G09F 19/12; G09F 19/18
USPC ........................................................ 362/540
See application file for complete search history.

(56) References Cited

U.S. PATENT DOCUMENTS

| | | | |
|---|---|---|---|
| 5,571,277 A | 11/1996 | Allred et al. | |
| 5,822,088 A * | 10/1998 | Danno | G03H 1/22 359/1 |
| 7,175,321 B1 | 2/2007 | Lopez | |

(Continued)

FOREIGN PATENT DOCUMENTS

| | | |
|---|---|---|
| DE | 102013108333 A1 | 2/2015 |
| DE | 102016202697 A1 | 8/2017 |

(Continued)

*Primary Examiner* — Christopher M Raabe
(74) *Attorney, Agent, or Firm* — Reising Ethington, P.C.

(57) ABSTRACT

A lamp assembly for a vehicle configured to display a logo or other indicia in the form of a virtual image indicium. The lamp assembly includes a dark chamber having a mirror image indicium with an indicium light source associated with the dark chamber, and a light chamber having an associated primary light source. A transparent divider is configured to reflect the mirror image indicium when the indicium light source is illuminated to create the virtual image indicium that is perceivable by an observer.

20 Claims, 5 Drawing Sheets

(56) References Cited

U.S. PATENT DOCUMENTS

| | | | |
|---|---|---|---|
| 8,317,379 B2 | 11/2012 | Oomen et al. | |
| 9,121,574 B2 | 9/2015 | Fidler et al. | |
| 9,684,166 B2 | 6/2017 | Kuehne | |
| 10,048,648 B2 | 8/2018 | Yang et al. | |
| 10,421,392 B2 * | 9/2019 | Mugge | F21S 43/13 |
| 2016/0009233 A1 | 1/2016 | Lund | |
| 2016/0357025 A1 | 12/2016 | King | |
| 2017/0184270 A1 | 6/2017 | Kim et al. | |
| 2017/0267164 A1 | 9/2017 | Muegge | |
| 2017/0327033 A1 | 11/2017 | Muegge et al. | |
| 2018/0220126 A1 | 8/2018 | Laack et al. | |

FOREIGN PATENT DOCUMENTS

| | | |
|---|---|---|
| DE | 102016205700 A1 | 10/2017 |
| DE | 102017206881 A1 | 10/2018 |
| DE | 102017206882 A1 | 10/2018 |
| EP | 3616994 A1 | 3/2020 |
| FR | 3057965 A1 | 4/2018 |
| GB | 2540474 A | 1/2017 |

* cited by examiner

LAMP ASSEMBLY

CROSS-REFERENCE TO RELATED APPLICATIONS

This application claims priority to U.S. application Ser. No. 16/778,056 filed on Jan. 31, 2020, which claims the benefit of U.S. Provisional Application Ser. No. 62/801,944 filed on Feb. 6, 2019, the entire contents of each are incorporated herein by reference.

TECHNICAL FIELD

This invention generally relates to lamp assemblies, and more particularly, to automotive lamp assemblies that can selectively display indicia.

BACKGROUND

Optical branding features can enhance the aesthetics of a vehicle. Optical branding is oftentimes accomplished with relatively complex, and sometimes expensive, optics to achieve the desired result. Further, with such systems, the logo or some other type of indicium must be projected onto a surface, which may be non-reflective or otherwise distort the imagery.

SUMMARY

According to one embodiment, there is provided a lamp assembly comprising: a dark chamber having a mirror image indicium; an indicium light source associated with the dark chamber; a light chamber; a primary light source associated with the light chamber; and a transparent divider located at least partially between the dark chamber and the light chamber and configured to reflect the mirror image indicium when the indicium light source is illuminated to create a virtual image indicium.

According to another embodiment, there is provided a lamp assembly, comprising: a dark chamber; a light chamber; an outer lens configured with a transparent portion and an opaque portion, the opaque portion being situated at least partially over the dark chamber; and a transparent divider configured to create a virtual image indicium at least partially visible in the light chamber through the transparent portion of the outer lens.

According to another embodiment, there is provided a method of operating a lamp assembly, the lamp assembly comprising a dark chamber having a mirror image indicium and an indicium light source associated with the dark chamber, and a light chamber and a primary light source associated with the light chamber, and a transparent divider located at least partially between the dark chamber and the light chamber. The method comprises the steps of: illuminating the mirror image indicium with the indicium light source associated with the dark chamber to create a virtual image indicium; and illuminating the transparent divider with the primary light source associated with the light chamber so that the virtual image indicium is no longer visible.

DRAWINGS

Preferred exemplary embodiments will hereinafter be described in conjunction with the appended drawings, wherein like designations denote like elements, and wherein.

DESCRIPTION

The lamp assemblies described herein provide a less complex, more cost-effective optical design and/or branding technique for vehicle applications. The lamp assemblies can be used in various vehicle applications to show indicia as a virtual image in the lamp when the lamp is not in use. For example, the lamp assemblies include two separate light sources associated with a light chamber and a dark chamber, respectively. The light chamber and the dark chamber are separated by a transparent divider. A mirror image indicium, which could include a vehicle brand or logo, for example, is located in the dark chamber. When illuminated with the light source associated with the dark chamber, the mirror image indicium is reflected on the transparent divider, creating a virtual image indicium viewable in the light chamber. When the light source associated with the light chamber is illuminated, the lamp assembly operates as a normal vehicle light and the virtual image indicium is no longer visible. The lamp assemblies herein provide optical branding capabilities that can avoid the use of expensive projector systems or the like to facilitate operation.

Figure 1:
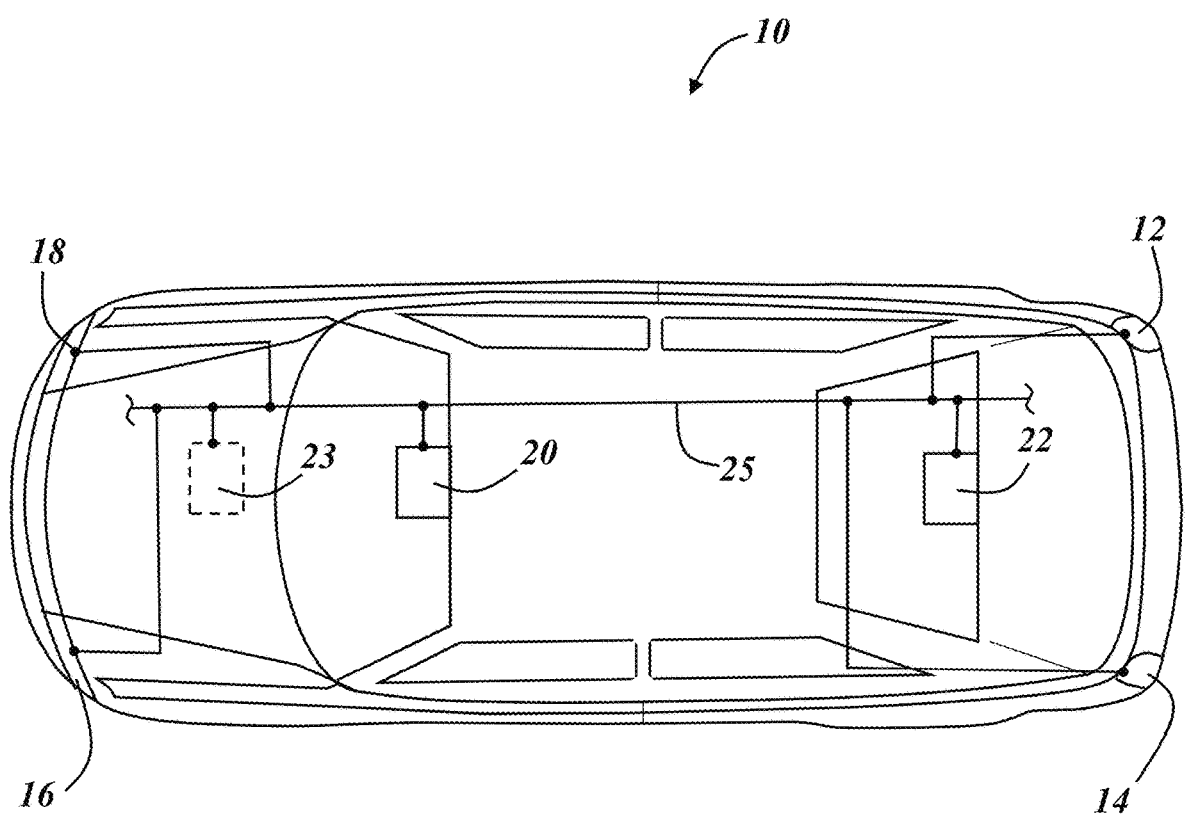
FIG. 1 is a top view of an automotive vehicle having a number of lamp assemblies.

FIG. 1 illustrates a vehicle 10 that includes lamp assemblies 12, 14, 16, 18, 20, 22. The description herein is focused on the lamp assembly 12; however, the components, configurations, operations, etc. of the lamp assembly 12 are applicable to other lamp implementations, including the lamp assemblies 14-22, for example. Oftentimes, it is desirable to have a symmetrical appearance, so embodiments of the vehicle 10 that include a lamp assembly 12 can also have the same indicia in the corresponding other lamp assembly 14 on the other side of the vehicle, for example. Moreover, while the preferred implementation is vehicle-based, other applications are possible. Further, other vehicle-based implementations are possible beyond what is illustrated herein. As shown in FIG. 1, the lamp assemblies of the vehicle 10 include tail lamp assemblies, or more particularly, rear combination lamp (RCL) assemblies including backup lamp assemblies 12, 14; headlight lamp assemblies 16, 18; and interior lamp assemblies 20, 22. The interior lamp assembly 20 may be a dome light or some other optical device within the interior of the vehicle 10. The interior lamp assembly 22 may be a center high-mount stop light (CHMSL) lamp assembly or the like. The lamp assemblies work advantageously well with applications having a clear outer lens with no optics (e.g., the outer lens has smooth outer surfaces without sharp ridges, the outer surface including the surface facing the interior of the housing and the surface facing the observer). Each lamp assembly 12-22 may be connected to an electronic control unit (ECU) 23, which in one embodiment, is a vehicle body control module (BCM) having an electronic processor and memory, via a vehicle communication network, bus 25 or the like. The ECU 23 can control operation of the various light sources in each lamp assembly 12-22.

Figure 2:
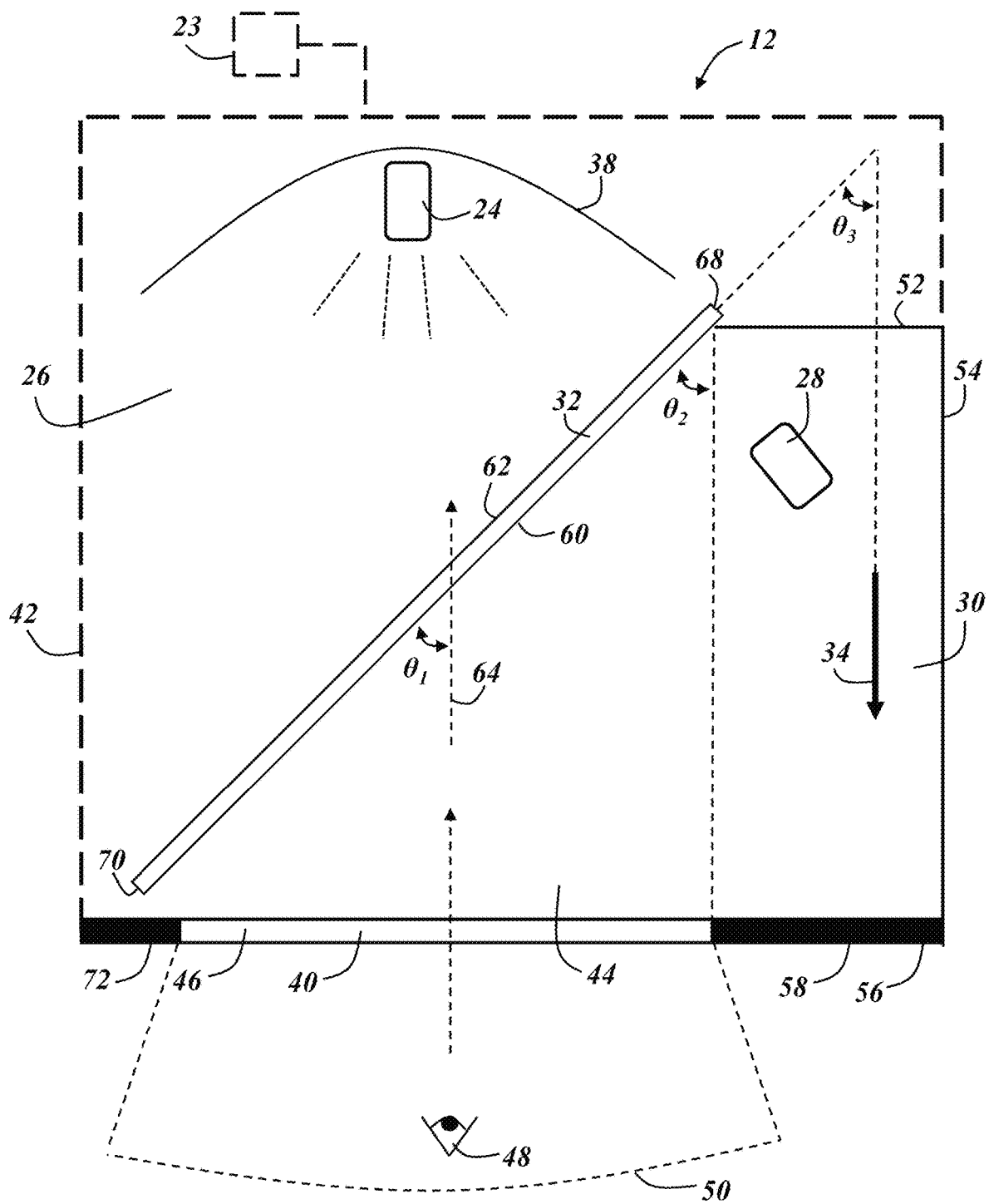
FIG. 2 is a schematic top view of one of the lamp assemblies of FIG. 1.
Figure 3:
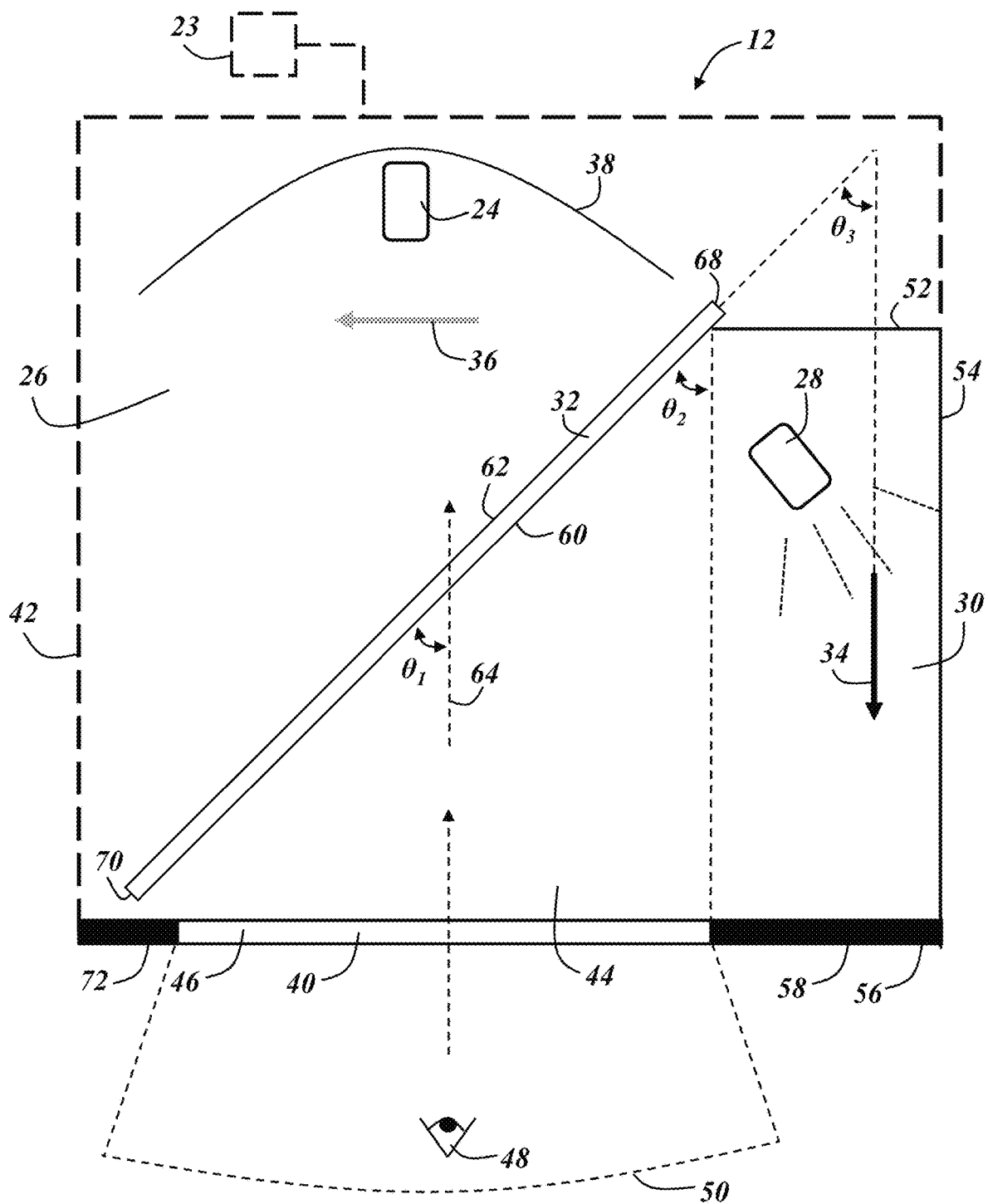
FIG. 3 is a schematic top view of the lamp assembly of FIG. 2.

FIGS. 2 and 3 are schematic top views of the backup portion of the lamp assembly 12. FIG. 2 shows a first mode of operation, as a standard lamp, with a primary light source 24 illuminated in a light chamber 26. FIG. 3 shows a second mode of operation, detailed more fully below, with an indicium light source 28 illuminated in a dark chamber 30. A transparent divider 32 is situated at least partially between the light chamber 26 and the dark chamber 30. The transparent divider 32 reflects an illuminated mirror image indicium 34 when the indicium light source 28 is energized, which creates a virtual image indicium 36 that appears to be floating within the light chamber 26.

The primary light source 24 and the indicium light source 28 are configured to illuminate the light chamber 26 and the dark chamber 30, respectively. The light sources 24, 28 may be included in any operable form, such as a light emitting diode (LED), an organic light emitting diode (OLED), a bulb, etc. As will be detailed further below, in one embodiment, the indicium light source 28 is an LED or OLED screen mounted in the dark chamber 30. In FIGS. 2 and 3, if the primary light source 24 is a bulb, it is desirable to centrally locate it with respect to a reflector 38. The reflector 38, which is a bowl-shaped reflector, may be included in applications such as the tail or RCL lamp assemblies 12, 14 and/or the head lamp assemblies 16, 18 where it is desirable to promote light transmission toward and through an outer lens 40. It is also possible to use the reflector 38 with other light source types, such as LEDs or OLEDs. Further, while the light sources are schematically illustrated, it is possible to vary the light source number and configuration from that particularly shown. For example, it may be desirable to have additional light sources associated with either the light chamber 26 and/or the dark chamber 30. Also, the light sources 24, 28 may be alternately positioned from what is schematically illustrated.

The light chamber 26 is an area of the lamp assembly 12 that is associated with the primary light source 24. In this embodiment, the light chamber 26 is generally defined by the transparent divider 32, the reflector 38, and possibly an outer housing 42 which is schematically illustrated in FIGS. 2 and 3. In the mode of operation shown in FIG. 2, the lamp assembly 12 works as a standard backup lamp. Accordingly, when the primary light source 24 is illuminated, light shines in the light chamber 26, through the transparent divider 32, into a reflection chamber 44, and out of a transparent portion 46 in the outer lens 40. The reflection chamber 44 is largely situated between the light chamber 26 and the dark chamber 30. An observer 48 within a primary viewing area 50 will perceive the light from the primary light source 24 as it shines in the light chamber 26, through the transparent divider 32 and reflection chamber 44, and out of the transparent portion 46 in the outer lens. The light chamber 26 does not need to be substantially lit up, per se, but it is preferably more perceivable from the primary viewing area 50 than the dark chamber 30 is.

The dark chamber 30 is an area of the lamp assembly 12 that is associated with the indicium light source 28. The dark chamber 30 does not need to be substantially darkened, per se, but it is less perceivable from the primary viewing area 50 than the light chamber 26 is. This is at least partially due to the presence of one or more opaque walls 52, 54, 56. In the illustrated embodiment, the opaque wall 56 is an opaque portion 58 in the outer lens 40. This opaque portion 58 of the dark chamber 30 helps block the mirror image indicium 34, which is housed in the dark chamber, from the primary viewing area 50. The other opaque walls 52, 54 may be integrated with the outer housing 42. Further, in some embodiments, there may not be an opaque wall 52, or the walls 52, 54, 56 may be configured differently than what is illustrated. For example, there could be one cylindrically shaped wall that at least partially blocks part of the primary viewing area 50. Other examples are certainly possible.

The transparent divider 32 at least partially divides the light chamber 26 and the dark chamber 30. The transparent divider 32 helps define a triangular shaped reflection chamber 44 that is located largely between the dark chamber 30 and the outer lens 40. The transparent divider 32 includes a dark chamber facing surface 60 and a light chamber facing surface 62. The surfaces 60, 62 of the transparent divider 32 are planar surfaces that extend from an end of the dark chamber 30 at the opaque wall 52 (if present) toward the outer lens 40.

The transparent divider 32 is arranged such that when the indicium light source 28 is illuminated, the transparent divider will reflect the illuminated mirror image indicium 34 to create the virtual image indicium 36, as shown in FIG. 3. To the observer 48, the transparent divider 32 is generally not visible, such that the virtual image indicium 36, which is a pure reflection of the mirror image indicium 34, appears to float in space in the light chamber 26. To better conceal the transparent divider 32 from the observer 48, the edges 68, 70 can be located behind the opaque wall 52 of the dark chamber 30 and another opaque portion 72 in the outer lens 40, respectively.

The transparent divider 32 is advantageously a clear piece of plastic, for example acrylic or polycarbonate, although other materials may be used. In one embodiment, a reflectance percentage of the transparent divider 32 is between 5-6% per surface 60, 62, at a 45° angle of incidence, as shown. This results in an approximately 10-12% total reflectance. In this embodiment, it is possible to generate the mirror image indicium 34 with a relatively low-power LED as the light source 28 and get a perceivable virtual image indicium 36, even during the daytime. However, in implementations such as those shown, in which the lamp assembly 12 is used as a backup lamp, the primary light source 24 should be about 10-12% brighter than normal, since this amount will be reflected by the transparent divider 32, out of the desired beam pattern. Accordingly, it is desirable in some implementations to proportionally increase the brightness of the primary light source 24 to account for the per surface 60, 62 reflectance of the transparent divider 32.

The transparent divider 32 is configured to create the virtual image indicium 36 when the indicium light source 28 is illuminated. The orientation of the transparent divider 32 is preferably about 40-50°, or more advantageously 45°, at one or more of the angles $\theta_1$, $\theta_2$, and $\theta_3$. As shown in FIGS. 2 and 3, the angle $\theta_1$ is an angle with respect to the transparent divider 32 and an axis aligned with the primary viewing direction 64 of the observer 48 (the primary viewing direction 64 being generally orthogonal to the outer lens 40). The angle $\theta_2$ is an angle with respect to the transparent divider 32 and the dark chamber 30 (e.g., a line orthogonal to the opaque wall 52, a line parallel to the opaque wall 54, or an axis that is aligned with the opening of the dark chamber). The angle $\theta_3$ is an angle with respect to the transparent divider 32 and an axis aligned with the mirror image indicium 34 as shown. Having one or more of the angles $\theta_1$, $\theta_2$, and $\theta_3$ at 45° can help create a pure reflection of the mirror image indicium 34 at the transparent divider 32, which appears as the virtual image indicium 36, now in its normal orientation, floating in space in the lamp assembly 12.

Figure 4:
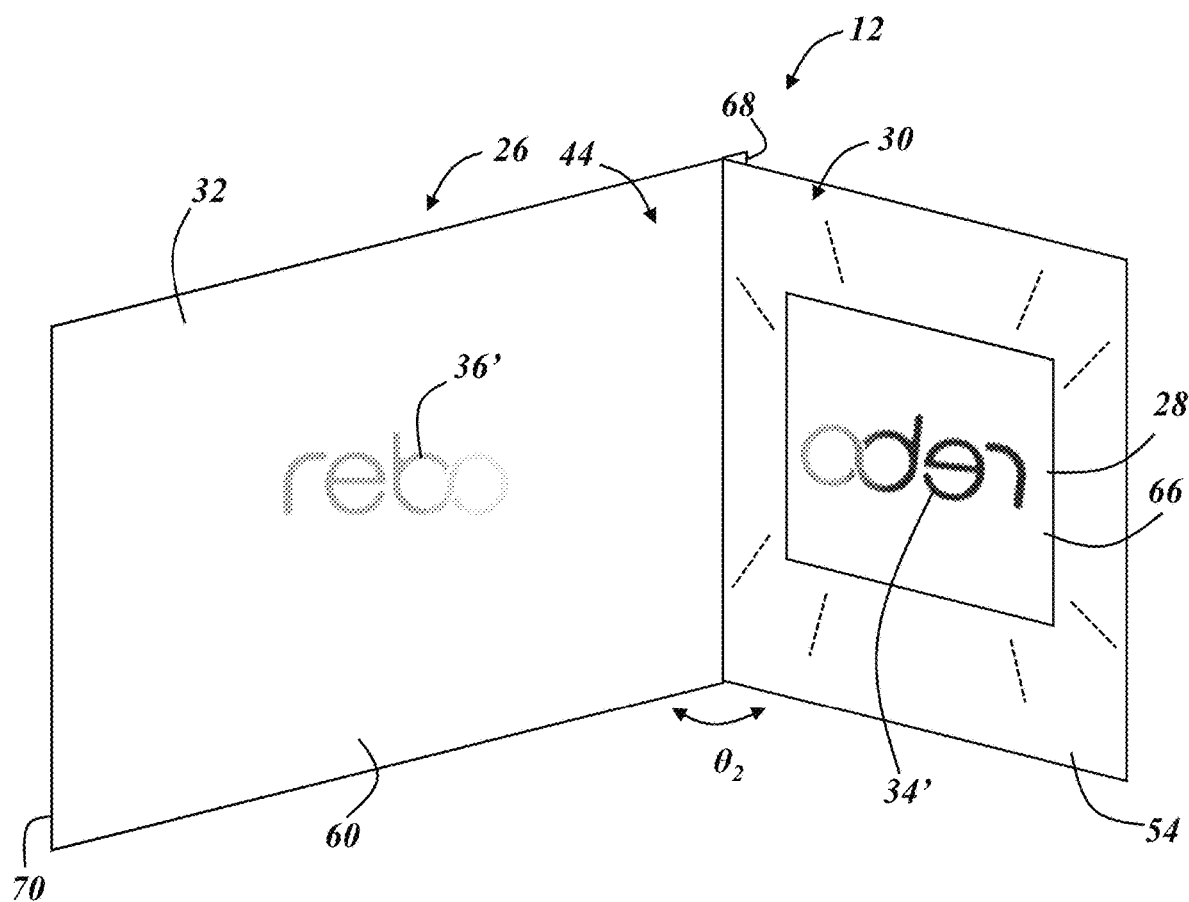
FIG. 4 is a partial front view of a lamp assembly in accordance with one embodiment.
Figure 5:
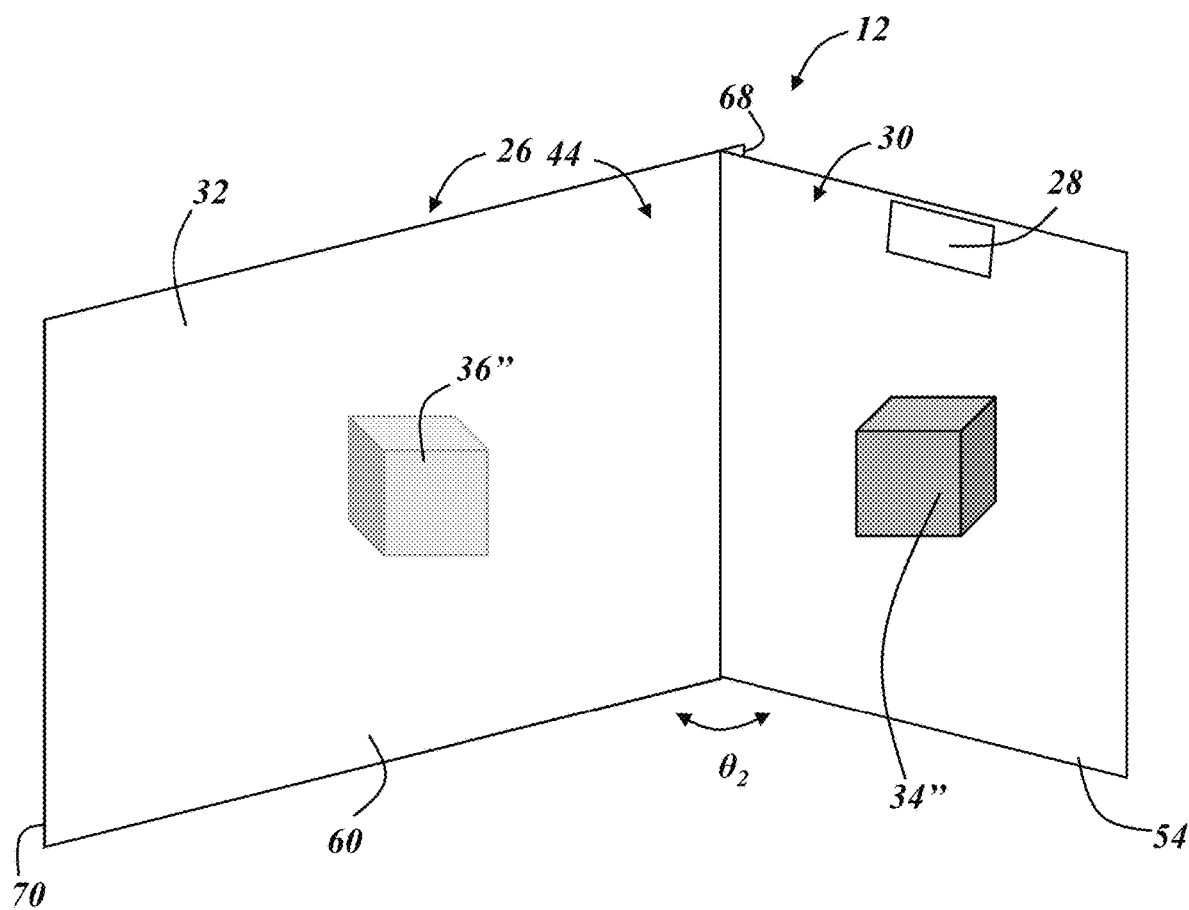
FIG. 5 is a partial front view of a lamp assembly in accordance with another embodiment.

With particular reference to FIGS. 3-5, when the primary light source 24 is not energized, the indicium light source 28 can be energized to provide optical branding through the reflection of the mirror image indicium 34. The mirror image indicium 34 is preferably one or more logos, words, abbreviations, designs, shapes, symbols, etc. that are reversed from the desired viewing orientation. In an advantageous embodiment, the mirror image indicium 34 is a backwards logo. The mirror image indicium 34 may include a 2-D or 3-D object that is situated in the dark chamber 30. The mirror image indicium 34 could be mounted or otherwise integrated with the opaque wall 54.

In the embodiment of FIG. 4, mirror image indicia 34' is presented on a small display 66 that is mounted to or otherwise located with, or within, the opaque wall 54. The display 66, which could be an LED or OLED display, can then also serve as the indicium light source 28. The mirror image indicia 34' may be a logo, which is displayed on the display 66 located on the opaque wall 54 in reverse. Then, upon powering of the indicium light source 28 (preferably when the primary light source 24 is not energized) the mirror image indicia 34' is projecting onto the transparent divider 32, which reflects it, forming the virtual image indicia 36'. Since the transparent divider 32 is not generally viewable by the observer 48, the virtual image indicia 36' appears to float in space in the light chamber 26 (which would be behind the transparent divider 32 in the partial front views of FIGS. 4 and 5 in which the outer lens 40 is removed).

FIG. 5 shows another embodiment of a mirror image indicium 34". In this embodiment, the mirror image indicium 34" is a 3-D object, such as an ornament or 3-D badge or logo. One advantage of the lamp assembly 12 is its ability to preserve the 3-D characteristics of the mirror image indicium 34" in the corresponding virtual image indicium 36", since the reflection by the transparent divider 32 is a pure reflection. Accordingly, the 3-D object appears to float in space in its entirety in the light chamber 26. To facilitate this, the 3-D object may be held in place with a transparent fixture in the dark chamber 30. In other embodiments, however, the mirror image indicium or indicia could be a simple 2-D sticker, a printed logo, or some other design.

Returning to FIGS. 2 and 3, the outer lens 40 can be configured and will likely vary depending on the desired application for the lamp assembly 12. For example, the outer lens 40 need not be generally planar as schematically illustrated in FIGS. 2 and 3, but may be rounded or otherwise shaped to conform to the particular application. Advantageously, at least a portion of the outer lens 40 is a transparent plastic with no optics so as to help keep the integrity of the virtual image indicium 36. The transparent portion 46 is advantageously clear in some embodiments, as this allows for the presentation of a colored or multi-colored virtual image indicia 36. However, other colored lenses are possible and will depend on the desired implementation. If the indicia 34, 36 are used with a standard tail lamp having only a red outer lens, it may be desirable to use black for the mirror image indicia 34 to promote visibility in the virtual image indicia 36. Accordingly, use of a monochromatic (e.g., black) indicia 34, 36 is desirable in implementations where a colored (i.e., not clear) outer lens 40 is used.

As illustrated and described, the outer lens 40 may include the transparent portion 46 and/or the opaque portions 58, 72. However, in other embodiments, the outer lens 40 may only include the transparent portion 46 in front of the reflection chamber 44, the transparent divider 32, and the light chamber 26. The dark chamber 30 may be a separate component not otherwise integrated directly with the outer lens 40.

Also, in some embodiments, there may not be an outer lens 40, or there could be one or more additional lenses beyond what is illustrated. Other transparent portions may also be included, such as with an RCL assembly 12, 14, where another red transparent portion for the tail lamp is included directly or indirectly adjacent to the clear backup lamp transparent portion 46.

The outer housing 42 can be configured and will likely vary depending on the desired application for the lamp assembly 12. The outer housing 42 may be shaped to fit into a particular location with respect to the vehicle 10, and may include various circuitry, controllers, etc., depending on the implementation, to facilitate operation of the lamp assembly. In an advantageous embodiment, both light sources 24, 28 are operably coupled to the ECU 23 via the CAN bus 25 or another connection system of the vehicle 10 to control operation. The ECU 23 can be set, in one embodiment, to energize or power the indicium light source 28 whenever the primary light source 24 is not illuminated, and to deenergize or turn off the indicium light source 28 when the primary light source 24 is illuminated.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A lamp assembly, comprising:
 a dark chamber having a screen configured to display a mirror image indicium;
 a light chamber; and
 a divider located at least partially between the dark chamber and the light chamber, wherein the divider is configured to reflect the mirror image indicium when the screen is illuminated to create a virtual image indicium.

2. The lamp assembly of claim 1, wherein the screen is a light emitting diode (LED) screen or an organic LED screen.

3. The lamp assembly of claim 1, wherein the lamp assembly is an interior lamp for a vehicle.

4. The lamp assembly of claim 1, wherein the lamp assembly is an exterior lamp for a vehicle.

5. The lamp assembly of claim 1, wherein the divider is a transparent divider made of an acrylic-based or polycarbonate-based material so that a reflectance percentage is between 5-6% per surface.

6. The lamp assembly of claim 1, wherein the dark chamber includes a wall having an opaque portion.

7. The lamp assembly of claim 6, wherein the opaque portion of the wall at least partially blocks the mirror image indicium from being observed by an observer.

8. A lamp assembly, comprising:
- a dark chamber having a mirror image indicium and a wall having an opaque portion;
- an indicium light source associated with the dark chamber; and
- a divider located adjacent to the dark chamber, wherein the divider is configured to reflect the mirror image indicium when the indicium light source is illuminated to create a virtual image indicium.

9. The lamp assembly of claim 8, wherein the indicium light source is a light emitting diode (LED) screen or an organic LED screen.

10. The lamp assembly of claim 8, wherein the opaque portion of the wall at least partially blocks the mirror image indicium from being observed by an observer.

11. The lamp assembly of claim 8, further comprising an outer lens configured with a transparent portion and an opaque portion, the opaque portion being situated at least partially over the dark chamber.

12. The lamp assembly of claim 11, wherein the divider at least partially defines a triangular shaped reflection chamber located at least partially between the dark chamber and the outer lens.

13. The lamp assembly of claim 8, wherein the divider is a transparent divider made of an acrylic-based or polycarbonate-based material so that a reflectance percentage is between 5-6% per surface.

14. The lamp assembly of claim 8, wherein the divider is located at least partially between the dark chamber and a light chamber.

15. The lamp assembly of claim 14, wherein the virtual image indicium is configured to appear within the light chamber.

16. A lamp assembly, comprising:
- a light chamber;
- a mirror image indicium;
- a wall having an opaque portion, wherein the opaque portion of the wall is situated at least partially around the mirror image indicium; and
- a divider configured to create a virtual image indicium from the mirror image indicium, wherein the divider is configured so that virtual image indicium appears, from a primary viewing direction of an observer, to be at least partially located in the light chamber.

17. The lamp assembly of claim 16, wherein the wall at least partially defines a dark chamber.

18. The lamp assembly of claim 17, wherein an indicium light source is associated with the dark chamber.

19. The lamp assembly of claim 18, wherein the indicium light source is a light emitting diode (LED) screen or an organic LED screen configured to display the mirror image indicium.

20. The lamp assembly of claim 17, wherein a plurality of indicium light sources are associated with the dark chamber.

* * * * *